United States Patent
Rothman et al.

(10) Patent No.: US 7,340,616 B2
(45) Date of Patent: Mar. 4, 2008

(54) POWER MANAGEMENT OF STORAGE UNITS IN A STORAGE ARRAY

(75) Inventors: Michael A. Rothman, Puyallup, WA (US); Vincent J. Zimmer, Federal Way, WA (US); Mark S. Doran, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 491 days.

(21) Appl. No.: 10/855,435

(22) Filed: May 26, 2004

(65) Prior Publication Data

US 2005/0268121 A1    Dec. 1, 2005

(51) Int. Cl.
*G06F 1/00* (2006.01)
(52) U.S. Cl. ........................................................ 713/300
(58) Field of Classification Search ................. 713/300
See application file for complete search history.

(56) References Cited

U.S. PATENT DOCUMENTS

| 6,549,241 | B2 * | 4/2003 | Hiroi | 348/460 |
| 2004/0186939 | A1 * | 9/2004 | Miyanishi et al. | 710/100 |
| 2005/0177841 | A1 * | 8/2005 | Ichikawa | 720/659 |
| 2005/0198435 | A1 * | 9/2005 | Lee et al. | 711/114 |
| 2006/0007468 | A1 * | 1/2006 | Tanaka | 358/1.14 |
| 2006/0123259 | A1 * | 6/2006 | Yokota et al. | 713/320 |

OTHER PUBLICATIONS

Adaptive Power Management for Mobile Hard Drives, IBM Corporation Storage Systems Division; http://ww.almaden.ibm.com/almaden/mobile_hard_drives.html; Apr. 2, 2004; 12 pp.

Colarelli, et al. "Massive Arrays of Idle Disks for Storage Archives," University of Colorado, Jul. 26, 2002; c. IEEE 2002; 11 pp.

Zhu, et al. "Reducing Energy Consumption of Disk Storage Using Power-Aware Cache Management," University of Illinois at Urbana Champaign, undated, 12 pp.

* cited by examiner

*Primary Examiner*—James K Trujillo
*Assistant Examiner*—Michael J Brown
(74) *Attorney, Agent, or Firm*—Konrad Raynes & Victor LLP; David W. Victor (57) ABSTRACT

Provided is a method, system, an program for power management of storage units in a storage array. A power profile is accessed for a storage array including a plurality of storage units, wherein each storage unit is enabled to operate in one of a plurality of power consumption modes, and wherein the power profile indicates a power mode specifying a power consumption mode. Data is migrated from at least one storage unit to at least one storage unit designated as an active storage unit consuming power in an active power consumption mode. The power consumption mode of at least one storage unit not designated as active is altered to the specified power consumption mode indicated in the accessed profile, wherein the specified power consumption mode consumes less power than the active power consumption mode.

38 Claims, 5 Drawing Sheets

Storage Unit Information Entry

POWER MANAGEMENT OF STORAGE UNITS IN A STORAGE ARRAY

BACKGROUND

Storage devices, such as hard disk drives, include adaptive power management programs that alter the power consumption mode of the disk drive based on current usage of the drive. The disk drive controller or device driver of the hard disk drive executing in the host operating system may adjust the power usage to an active, standby, idle or sleep mode based on the frequency of user access. Computer systems often include a power management program that the user can configure to specify the power consumption mode, e.g., idle, standby or sleep mode based on the length of time since the last received user input. For instance, the Power Options Properties utility provided with the Microsoft Windows operating system provides such capabilities. (Microsoft and Windows are registered trademarks of Microsoft Corporation). Although placing a disk drive in a lower power consumption mode, such as standby, idle or sleep conserves power, such lower consumption modes increases disk latency. If the disk drive is in a low power consumption mode when receiving an Input/Output (I/O) request, latency is experienced while waiting for the disk drive to power-up all components to execute the I/O request. The lower the power consumption mode, the greater the latency and delays that occur to fully power-up the disk components to execute an I/O request received in such power savings mode.

System administrators managing large storage arrays of interconnected hard disk drives may specify power consumption modes for the hard disk drives in the storage array. Typically, the administrator will balance power conservation and latency goals in determining the power consumption mode for the disk drives in the array.

DETAILED DESCRIPTION

In the following description, reference is made to the accompanying drawings which form a part hereof and which illustrate several embodiments. It is understood that other embodiments may be utilized and structural and operational changes may be made without departing from the scope of the embodiments.

Figure 1:
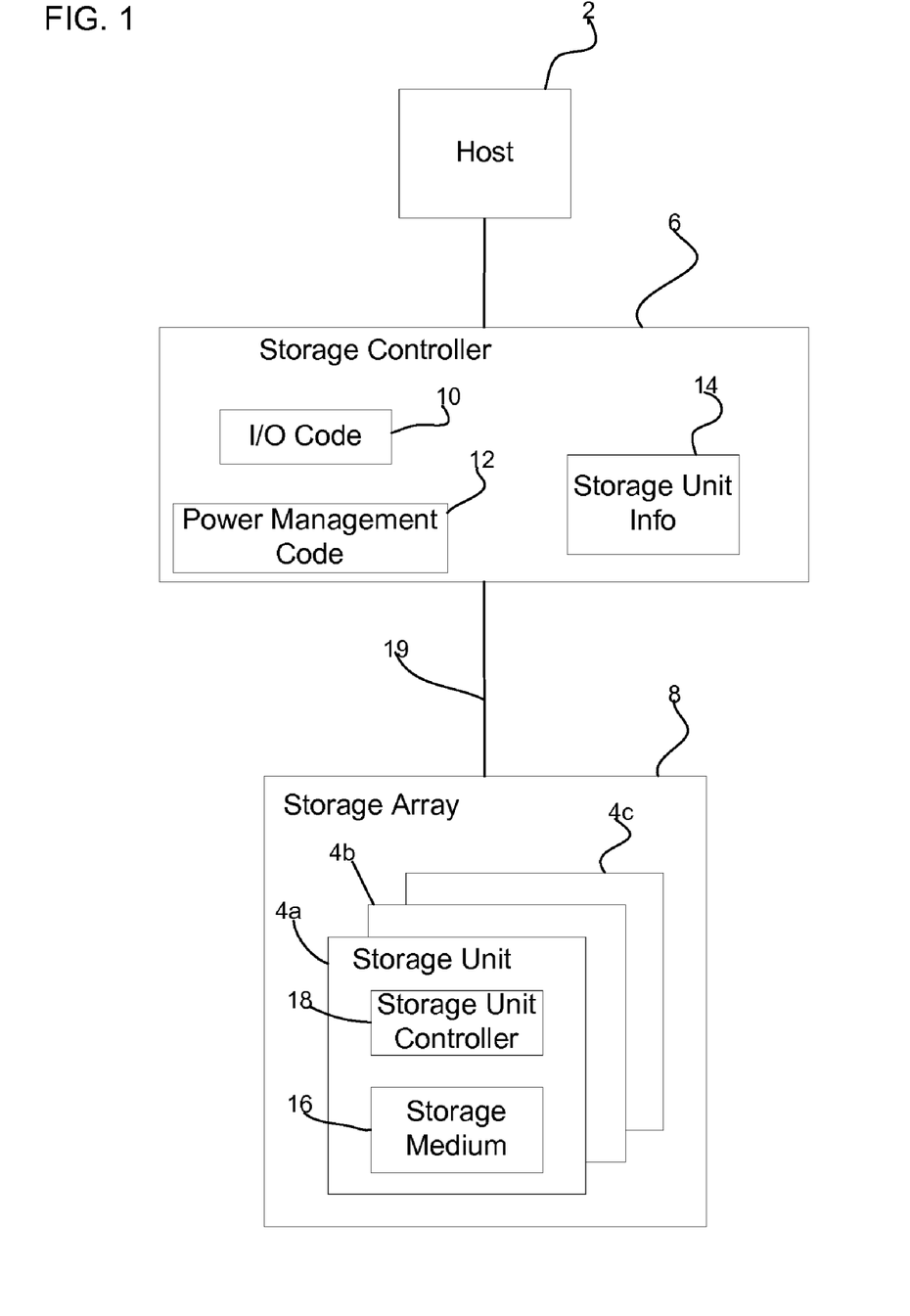
FIGS. 1 and 5 illustrate computing environments.

FIG. 1 illustrates a computing environment embodiment. One or more hosts 2 (only one is shown) communicate I/O requests to multiple storage units 4*a*, 4*b*, 4*c* via a storage controller 6. The storage units 4*a*, 4*b*, 4*c* may be maintained in a storage array 8, comprising a housing including the interconnected storage units 4*a*, 4*b*, and 4*c*, such as an array of hard disk drives or tape library. The storage controller 6 may be implemented within the housing of the host 2 and communicate over an internal bus interface or be implemented in a system external to the host 2 and communicate over a network. In implementations where the storage controller 6 is internal to the host 2 housing, the storage controller may be implemented in an expansion card inserted in an expansion card slot of the host 2 or implemented in a chip set on the host 2 motherboard. The storage controller 6 includes I/O code 10 to manage I/O requests from the one or more hosts 2 to the storage units 4*a*, 4*b*, 4*c*. The storage controller 6 further includes power management code 12 to manage the power consumption of the storage units 4*a*, 4*b*, 4*c* in the storage array 8 and storage unit information 14 providing information on the status of the managed storage units 4*a*, 4*b*, 4*c*. Alternatively, the storage controller 6 may be included in the housing of the storage array 8. Yet further, the storage controller 6 may comprise may be implemented in a separate system external to the host 2 and storage array 8, such as in a storage server or enterprise storage system.

Each storage unit 4*a*, 4*b*, 4*c* includes a storage medium 16 and a storage unit controller 18. The storage controller 6 communicates I/O requests to the storage unit controller 18, which then manages the execution of the I/O requests against the storage medium 16. The storage medium 16 may comprise a magnetic storage medium or other storage media known in the art. The storage unit 4*a*, 4*b*, 4*c* may comprise non-volatile storage units known in the art, such as hard disk drives, tape drives, etc. The storage controller 6 includes the capability to manage the power consumption at the storage unit 4*a*, 4*b*, 4*c* by issuing power management commands to the storage unit controller 18 to implement for the particular storage unit 4*a*, 4*b*, 4*c*. The storage unit controller 18 is capable of causing the storage units 4*a*, 4*b*, 4*c* to transition to the following power states:

Active Mode: power is supplied to all components of the storage unit 4*a*, 4*b*, 4*c* to enable the storage unit 4*a*, 4*b*, *c* to immediately seek, read, and write with minimal latency. The average power consumption in active mode may be 11.4 watts and the time to activation, i.e., latency, may be zero.

Idle Mode: In idle mode, power consumption is reduced by turning off certain drive electronics. For hard disk drives, the read/write head may be moved to a parking position, and the servo tracking function either is turned off, or operated at a reduced level of control. The storage medium 16 disk may remain spinning and the interface electronics may remain ready to accept commands. The storage unit 4*a*, 4*b*, 4*c* returns to active mode when a new command is received. The average power consumption in idle mode may be 8.1 watts and the time to activation may be 10 to 50 microseconds.

Standby Mode: In standby mode, for disk drive units, the spindle or disk spinning motor may be stopped, and many electronics may be powered off. The interface electronics may remain ready to accept commands, and the drive will return to active mode when a new command is received. The average power consumption in idle mode may be 1.5 watts and the time to activation may be from $10e^6$ to $20e^6$ microseconds.

Sleep Mode: In sleep mode, all electronics are powered off except those needed to respond to a wake-up command. Sleep mode consumes around one watt and time to activation comprises about $20e^6$ to $50e^6$ microseconds. Note, the discussed power consumption amounts and latency times may vary depending on the hardware capabilities of the storage units 4*a*, 4*b*, 4*c*.

The storage controller 6 communicates with the storage array 8 over an interface 19. In certain embodiments, the interface 19 may comprise a bus interface, such as a Peripheral Component Interconnect (PCI) interface, Small Computer System Interface (SCSI), Serial Attached SCSI (SAS), and other bus interfaces known in the art. PCI is described in the publication "PCI Local Bus Specification", Rev. 2.3 (March 2002), published by the PCI Special Interest Group; SCSI is described in the publication; SCSI is described in the publication "SCSI Architecture Model—3 (SAM 3)", published by ANSI, T10, Project 1561-D (March 2004); and SATA is described in the publication "Serial ATA: High Speed Serialized AT Attachment", Rev. 1.0a (January 2003). Alternatively, the interface 19 may comprise a network connection to connect over a network, such as a Local Area Network (LAN), Wide Area Network (WAN), Storage Area Network (SAN), etc.

Figure 2:
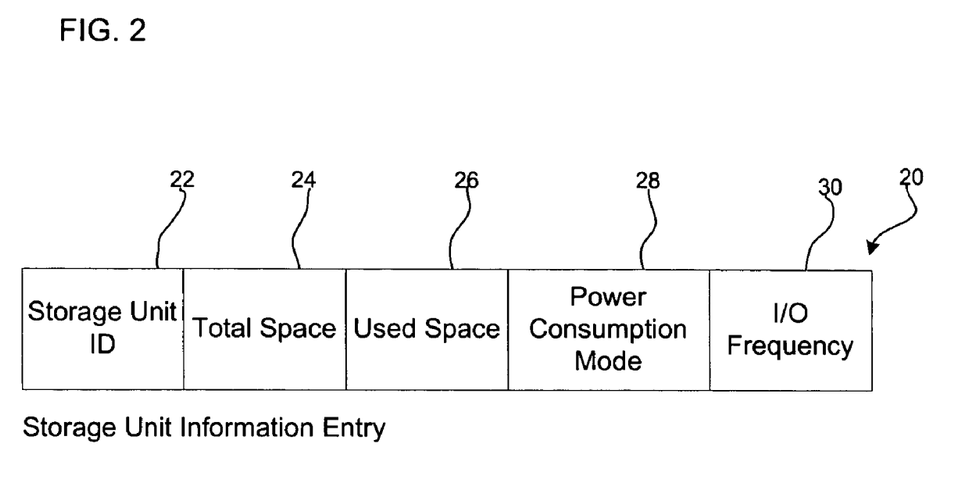
FIG. 2 illustrates information maintained on storage units to manage power consumption.

The storage unit information 14 includes an entry 20 for each storage unit 4a, 4b, 4c. Each storage unit entry 20 includes Identifier 22: an identifier of the storage unit.

Total Space 24: total free space in the storage unit 4a, 4b, 4c.

Used Space 26: amount of bytes including system or user data.

Power Consumption 28: indicates the current power consumption mode of the storage unit 4a, 4b, 4c.

Input/Output (I/O) Frequency 30: indicates the frequency at which I/O requests are directed to the storage unit 4a, 4b, 4c.

Figure 3:
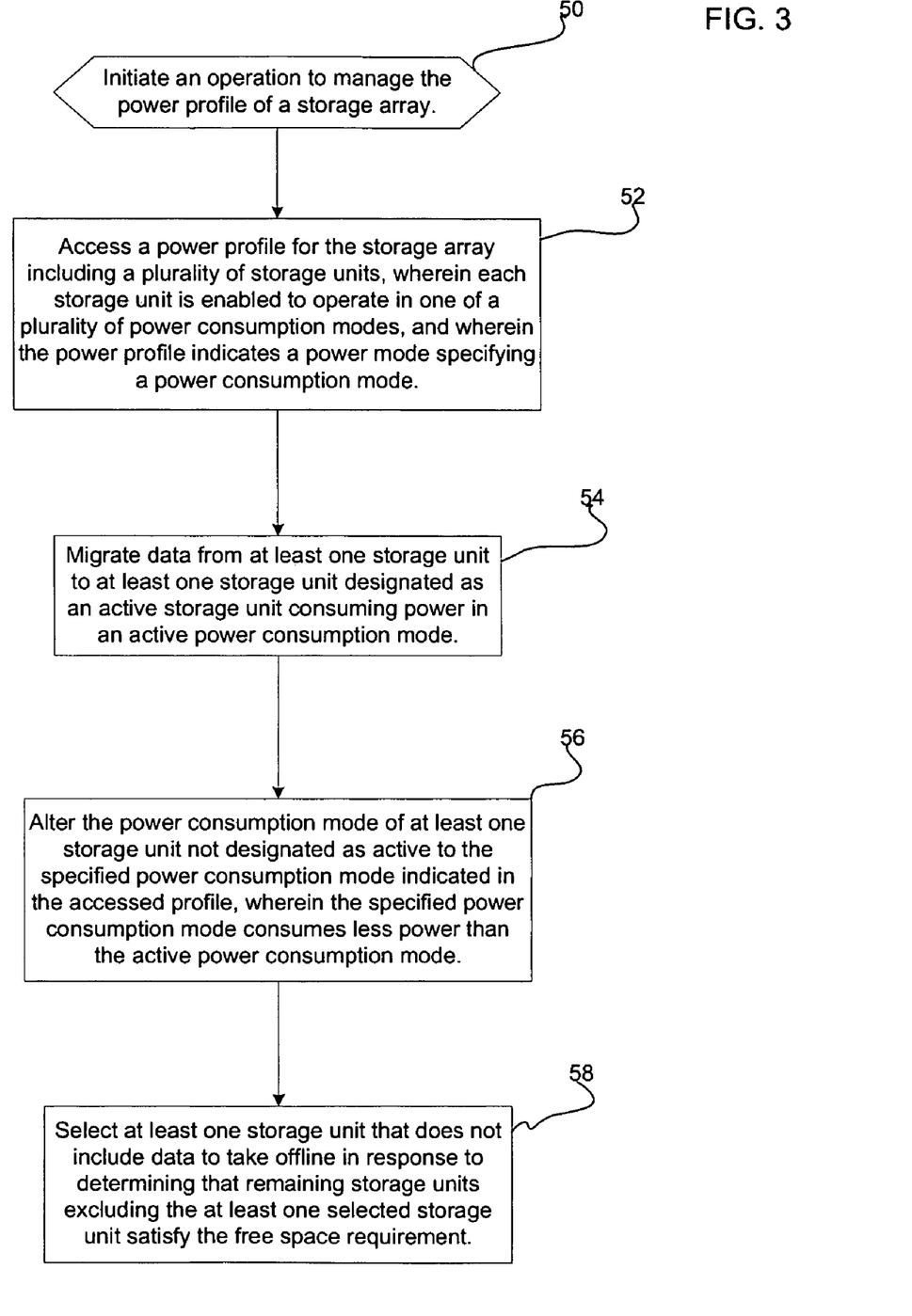
FIGS. 3 and 4 illustrate power management operations.
Figure 4:
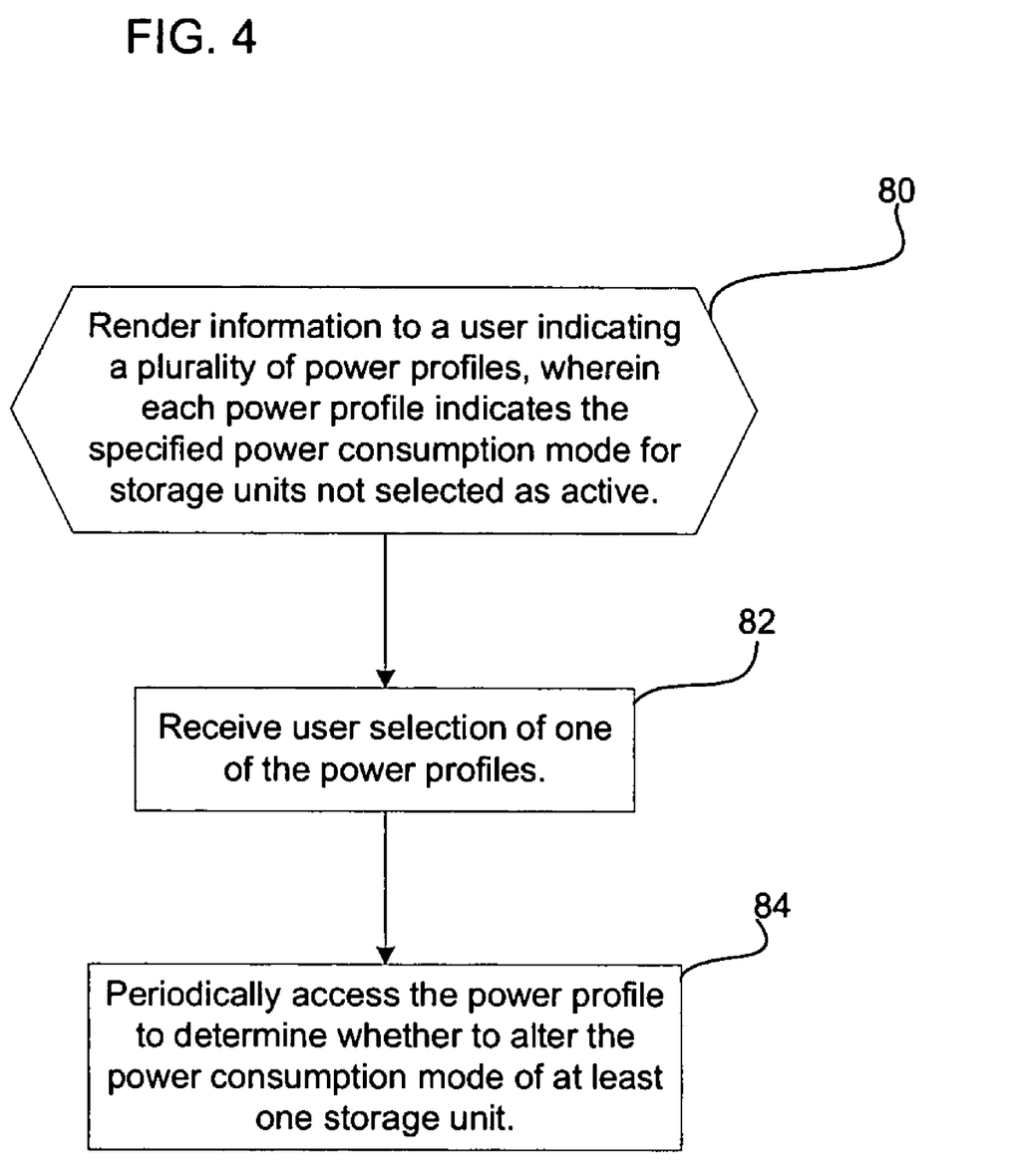

In described embodiments, the storage controller 6 manages the power consumption of the storage units 4a, 4b, 4c. FIGS. 3 and 4 illustrate operations performed by the storage controller 6 to manage the power consumption of the storage units 4a, 4b, 4c. The storage controller 6 initiates (at block 50) an operation to manage the power profile of a storage array 8. The storage controller 6 may periodically run a power management routine to determine whether adjustments may be made to lower power consumption of the storage units 4a, 4b, 4c in the array 8. Alternatively, the storage controller 6 may initiate the power management routine in response to an event, such as the temperature of the storage array 8 reaching a threshold value, an addition or removal of a storage unit 4a, 4b, 4c to the array 8, user activation, etc. The storage controller 6 accesses (at block 52) a power profile for the storage array 8 including a plurality of storage units, wherein each storage unit is enabled to operate in one of a plurality of power consumption modes, e.g., active, idle, standby, sleep. The power profile indicates a power mode specifying a power consumption mode and may further indicate a free space requirement of an amount of free space to maintain available in the storage units 4a, 4b, 4c in the storage array 8. For instance, the power profile may indicate to take any disks offline not needed to satisfy the free space requirement and to maintain all disks in the active state, or maintain disks not including active data in an idle, standby or sleep power consumption mode.

The storage controller 6 migrates (at block 54) data from at least one storage unit 4a, 4b, 4c to at least one storage unit designated as an active storage unit consuming power in an active power consumption mode. For instance, the storage controller 6 may determine if there is sufficient available space on current storage units such that data may be migrated from other storage units so that the storage units from which data is migrated have all free space and are not actively used for I/O requests. If there is available space in storage units to store the data on other storage units, then the operation at block 54 may be performed, otherwise the operation may not be performed if there is not sufficient available space on some storage units to store the data from other storage units. The power consumption mode of at least one storage unit 4a, 4b, 4c not designated as active is adjusted (at block 56) to the specified power consumption mode indicated in the accessed profile, wherein the specified power consumption mode consumes less power than the active power consumption mode, e.g., idle, standby, sleep or other power consumption modes known in the art. A storage unit 4a, 4b, 4c may be designated as active if it includes data subject to I/O requests and inactive if it does not include data being accessed, such as including only free space. When adjusting the power consumption mode, the power consumption mode 28 (FIG. 2) field in the storage unit information entry 20 for the adjusted storage unit 4a, 4b, 4c may be updated with the new altered power consumption mode.

When the power profile includes a free space requirement, the storage controller 6 selects (at block 58) at least one storage unit that does not include data to take offline in response to determining that remaining storage units excluding the at least one selected storage unit satisfy the free space requirement. In certain embodiments, storage units taken offline are completely powered-off and consume no power. Further, the selected storage units taken offline may have been the storage units from which data was migrated, such that the storage controller 6 migrates data from certain storage units so that those storage units from which the data is migrated may be taken offline, as long as the remaining storage units 4a, 4b, 4c include sufficient space to satisfy the free space requirements indicated in the accessed power profile.

In certain embodiments, the storage unit 4a, 4b, 4c whose power consumption mode is adjusted comprises the at least one storage unit 4a, 4b, 4c from which data is migrated, which may comprise the storage units having only free space, not active data. In further embodiments, the selection of a storage unit from which to migrate the data is based on the access frequency of the storage units, e.g., I/O frequency 30 (FIG. 2) in the storage unit information 14. Further, the selected storage unit from which data is migrated may have a lower access frequency than the storage unit to which the data is migrated. The low access frequency storage units from which data is migrated may then have their power adjusted to a lower power consumption mode, so that higher access data remains on the storage units operating in active power consumption mode. Further, in one embodiment, the power consumption mode of at least one storage unit having a relatively lower access frequency than other storage units is altered. In certain embodiments, there are a plurality of eligible target storage units to which data is capable of being migrated. In such case, the selection of one target storage unit 4a, 4b, 4c to receive the migrated data from one source storage unit is made such that the selected target storage unit has an access frequency closest to the access frequency of the source storage unit from which the data is migrated. For instance, data from a disk having a low access frequency is migrated to another low access frequency disk. Alternatively, data from low access frequency disks may be migrated to high access frequency disks to distribute the high access frequency data to different disks to allow parallel access of such high frequency access data from multiple disk drives.

Described embodiments also enable a user to program the storage controller 6 to use a specific power profile to apply to the storage array 8. With respect to FIG. 4, information is rendered (at block 80) to a user indicating a plurality of power profiles, wherein each power profile indicates the specified power consumption mode for storage units not selected as active. In certain embodiments, the storage controller 6 or some other program may render a graphical user interface (GUI) through which the user may select a power profile for the storage controller 8 to use to manage the power consumption of the storage array 8. For instance, the storage controller 6 may include an embedded Hypertext Transfer Protocol (HTTP) engine to allow a user to access over an HTTP network a document, such as a Hypertext Markup Language (HTML) or Extensible Markup Language (XML) page providing a GUI through which a user may select the power management profile used by the storage controller 8. HTTP is described in the publication "Hypertext Transfer Protocol—HTTP/1.1", Request for Comments 2616 (Copyright The Internet Society, 1999); HTML is described in the publication "HTML 4.01 Specification" (Copyright W3C, 1999); and XML is described in the publication "Extensible Markup Language (XML) 1.0 (Third Edition)" (Copyright W3C 2004). Alternatively, the user may use line commands or other techniques to specify a power profile to the storage controller 6. The storage controller 6 receives (at block 82) user selection of one of the power profiles and periodically accesses (at block 84) the power profile to determine whether to alter the power consumption mode of at least one storage unit by performing the operations described with respect to FIG. 3.

Described embodiments provide capabilities implemented in a storage controller to dynamically manage the power consumption of a plurality of storage units to satisfy certain user specified power consumption goals and satisfy certain storage environment requirements, such as free space and latency requirements. Users may specify a power consumption mode that balances power savings and latency goals by selecting the power consumption mode of storage units not having active data. For instance, if latency is a greater concern, then the storage units not having active data but that remain online to provide sufficient free space may be maintained at a higher power consumption mode, such as active or idle, whereas if reducing power consumption is more important than latency, then the power consumption mode of the storage units not having active data but that remain online may be in idle or sleep mode.

ADDITIONAL EMBODIMENT DETAILS

The described embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the embodiments, and that the article of manufacture may comprise any information bearing medium known in the art.

The described operations may be performed by circuitry, where "circuitry" refers to either hardware or software or a combination thereof. The circuitry for performing the operations of the described embodiments may comprise a hardware device, such as an integrated circuit chip, Programmable Gate Array (PGA), Application Specific Integrated Circuit (ASIC), etc. The circuitry may also comprise a processor component, such as an integrated circuit, and code in a computer readable medium, such as memory, wherein the code is executed by the processor to perform the operations of the described embodiments.

In certain systems, the power management program may be implemented in a storage controller managing access to a plurality of attached storage units, such as disk drives. The storage controller may comprise a RAID controller, JBOD controller, a storage server or any other device known in the art for managing access to a plurality of storage units.

Figure 5:
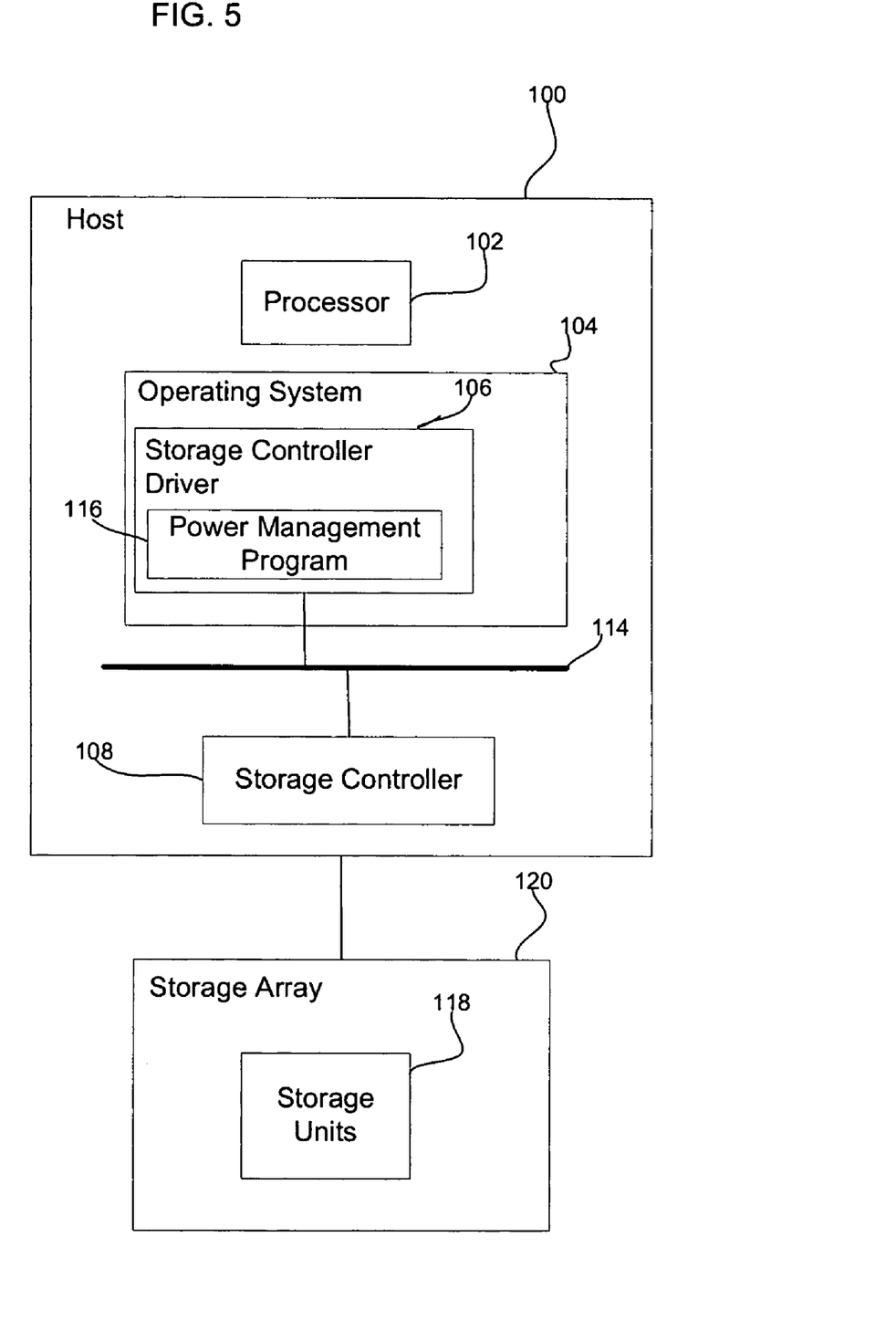

In alternative embodiments, the power management operations may be implemented in code executing in a component external to the storage controller, such as in a device driver for the storage controller or a power management utility executing in a host system that communicates with the storage controller. FIG. 5 illustrates an alternative architecture in which described power management operations may be implemented. A host system 100 includes a processor 102 and an operating system 104 having a storage controller device driver 106 to provide an interface between the operating system 104 and a storage controller 108. The storage controller device driver 106 communicates with the storage controller 108 over a bus interface 114. Further, the storage controller device driver 106 includes a power management program 116 to manage the power consumption of storage units 118 in storage array 120 and perform the operations described above with respect to FIGS. 3 and 4 via the storage controller 108. Alternatively, the power management program 116 may comprise a component external to the storage controller device driver 106 executing in the host 100 that performs power management operations by interfacing with the storage controller device driver 106.

The storage array whose power consumption is managed may comprise interconnected hard disk drives. In alternative embodiments, the storage array whose power consumption is managed may comprise a library of tape cartridges, optical disks or other storage units known in the art.

The illustrated operations of FIGS. 3 and 4 show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to limit the embodiments to the precise form disclosed. Many modifications and variations are possible in light of the above teaching.

What is claimed is:

1. A method, comprising:

accessing a power profile for a storage array including a plurality of storage units, wherein each storage unit is enabled to operate in one of a plurality of power consumption modes, and wherein the power profile indicates a power mode specifying a power consumption mode;

migrating data from at least one storage unit to at least one storage unit designated as an active storage unit consuming power in an active power consumption mode; and altering the power consumption mode of the at least one storage unit from which the data is migrated to the specified power consumption mode indicated in the accessed profile, wherein the specified power consumption mode consumes less power than the active power consumption mode.

2. The method of claim 1, wherein the specified power consumption mode is capable of comprising one of an active, idle, standby and sleep power consumption mode.

3. The method of claim 1, further comprising:
maintaining information on an access frequency for the storage units; and
selecting at least one storage unit from which to migrate data based on the access frequency information for the storage units, wherein data is migrated from the at least one selected storage unit.

4. The method of claim 3, wherein the selected at least on storage unit has a lower access frequency than the at least one storage unit to which the data is migrated.

5. The method of claim 3, wherein the storage units include eligible target storage units to which data is capable of being migrated from at least one selected source storage unit, further comprising:
selecting one target storage unit to receive the migrated data from one selected source storage unit such that of the eligible target storage units, the selected target storage unit has an access frequency closest to the access frequency of the selected source storage unit from which the data is migrated.

6. The method of claim 1, further comprising:
maintaining information on an access frequency for the storage units; and
altering the power consumption mode of at least one storage unit having a relatively lower access frequency than other storage units.

7. The method of claim 1, wherein the power profile indicates a free space requirement, further comprising:
selecting at least one storage unit that does not include data to take offline in response to determining that remaining storage units excluding the at least one selected storage unit satisfy the free space requirement.

8. The method of claim 7, wherein data is migrated from the at least one selected storage unit to at least one active storage unit.

9. The method of claim 1, further comprising:
lowering the power consumption mode of at least one storage unit that includes only free space.

10. The method of claim 1, further comprising:
rendering information to a user indicating a plurality of power profiles, wherein each power profile indicates the specified power consumption mode for storage units not selected as active; and
receiving user selection of one of the power profiles;
periodically accessing the power profile to determine whether to alter the power consumption mode of at least one storage unit.

11. The method of claim 10, wherein the plurality of power profile modes indicate different power consumption modes for storage units not designated as active.

12. A storage controller in communication with a plurality of storage units in a storage array, wherein each storage unit is enabled to operate in one of a plurality of power consumption modes, comprising:
circuitry enabled to:
access a power profile for the storage array indicating a power mode specifying a power consumption mode;
migrate data from at least one storage unit to at least one storage unit designated as an active storage unit consuming power in an active power consumption mode; and
alter the power consumption mode of at least one storage unit from which the data was migrated to the specified power consumption mode indicated in the accessed profile, wherein the specified power consumption mode consumes less power than the active power consumption mode.

13. The storage controller of claim 12, wherein the specified power consumption mode is capable of comprising one of an active, idle, standby and sleep power consumption mode.

14. The storage controller of claim 12, wherein the circuitry is further enabled to:
maintain information on an access frequency for the storage units; and
select at least one storage unit from which to migrate data based on the access frequency information for the storage units, wherein data is migrated from the at least one selected storage unit.

15. The storage controller of claim 14, wherein the selected at least on storage unit has a lower access frequency than the at least one storage unit to which the data is migrated.

16. The storage controller of claim 14, wherein the storage units include eligible target storage units to which data is capable of being migrated from at least one selected source storage unit, wherein the circuitry is further enabled to:
select one target storage unit to receive the migrated data from one selected source storage unit such that of the eligible target storage units, the selected target storage unit has an access frequency closest to the access frequency of the selected source storage unit from which the data is migrated.

17. The storage controller of claim 12, wherein the circuitry is further enabled to:
maintain information on an access frequency for the storage units; and
alter the power consumption mode of at least one storage unit having a relatively lower access frequency than other storage units.

18. The storage controller of claim 12, wherein the power profile indicates a free space requirement, wherein the circuitry is further enabled to:
select at least one storage unit that does not include data to take offline in response to determining that remaining storage units excluding the at least one selected storage unit satisfy the free space requirement.

19. The storage controller of claim 18, wherein data is migrated from the at least one selected storage unit to at least one active storage unit.

20. The storage controller of claim 12, further comprising:
lowering the power consumption mode of at least one storage unit that includes only free space.

21. The storage controller of claim 12, wherein the circuitry is further enabled to:

render information to a user indicating a plurality of power profiles, wherein each power profile indicates the specified power consumption mode for storage units not selected as active;

receive user selection of one of the power profiles; and periodically access the power profile to determine whether to alter the power consumption mode of at least one storage unit.

22. The storage controller of claim 21, wherein the plurality of power profile modes indicate different power consumption modes for storage units not designated as active.

23. The storage controller of claim 12, wherein the storage controller receives I/O requests from a host system directed to storage units in the storage array, wherein the storage controller is implemented within the host system.

24. The storage controller of claim 12, wherein the storage controller receives I/O requests from a host system directed to storage units in the storage array, wherein the storage controller is implemented in a system external to the host system and in data communication with the host system.

25. A system, comprising:
a storage array having a plurality of hard disk drives;
a storage controller managing Input/Output (I/O) access to the storage array; and
circuitry enabled to:
access a power profile for the storage array indicating a power mode specifying a power consumption mode;
migrate data from at least one hard disk drive to at least one hard disk drive designated as an active hard disk drive consuming power in an active power consumption mode; and
alter the power consumption mode of the at least one hard disk drive from which the data was migrated to the specified power consumption mode indicated in the accessed profile, wherein the specified power consumption mode consumes less power than the active power consumption mode.

26. The system of claim 25, wherein the circuitry is implemented in the storage controller.

27. The system of claim 25, wherein the circuitry is implemented in a component external to and in communication with the storage controller.

28. An article of manufacture enabled to:
access a power profile for a storage array including a plurality of storage units, wherein each storage unit is enabled to operate in one of a plurality of power consumption modes, and wherein the power profile indicates a power mode specifying a power consumption mode;
migrate data from at least one storage unit to at least one storage unit designated as an active storage unit consuming power in an active power consumption mode; and
alter the power consumption mode of the at least one storage unit from which the data was migrated to the specified power consumption mode indicated in the accessed profile, wherein the specified power consumption mode consumes less power than the active power consumption mode.

29. The article of manufacture of claim 28, wherein the specified power consumption mode is capable of comprising one of an active, idle, standby and sleep power consumption mode.

30. The article of manufacture of claim 28, further enabled to:
maintain information on an access frequency for the storage units; and
select at least one storage unit from which to migrate data based on the access frequency information for the storage units, wherein data is migrated from the at least one selected storage unit.

31. The article of manufacture of claim 30, wherein the selected at least on storage unit has a lower access frequency than the at least one storage unit to which the data is migrated.

32. The article of manufacture of claim 30, wherein the storage units include eligible target storage units to which data is capable of being migrated from at least one selected source storage unit, further enabled to:
select one target storage unit to receive the migrated data from one selected source storage unit such that of the eligible target storage units, the selected target storage unit has an access frequency closest to the access frequency of the selected source storage unit from which the data is migrated.

33. The article of manufacture of claim 28, further enabled to:
maintain information on an access frequency for the storage units; and
alter the power consumption mode of at least one storage unit having a relatively lower access frequency than other storage units.

34. The article of manufacture of claim 28, wherein the power profile indicates a free space requirement, further enabled to:
select at least one storage unit that does not include data to take offline in response to determining that remaining storage units excluding the at least one selected storage unit satisfy the free space requirement.

35. The article of manufacture of claim 34, wherein data is migrated from the at least one selected storage unit to at least one active storage unit.

36. The article of manufacture of claim 28, further enabled to:
lower the power consumption mode of at least one storage unit that includes only free space.

37. The article of manufacture of claim 28, further enabled to:
render information to a user indicating a plurality of power profiles, wherein each power profile indicates the specified power consumption mode for storage units not selected as active;
receive user selection of one of the power profiles;
periodically access the power profile to determine whether to alter the power consumption mode of at least one storage unit.

38. The article of manufacture of claim 37, wherein the plurality of power profile modes indicate different power consumption modes for storage units not designated as active.

* * * * *

UNITED STATES PATENT AND TRADEMARK OFFICE
CERTIFICATE OF CORRECTION

PATENT NO.        : 7,340,616 B2                                    Page 1 of 1
APPLICATION NO.   : 10/855435
DATED             : March 4, 2008
INVENTOR(S)       : Michael A. Rothman et al.

It is certified that error appears in the above-identified patent and that said Letters Patent is hereby corrected as shown below:

Column 8, Line 13, insert --the-- after "consumption mode of".

Signed and Sealed this

Twelfth Day of October, 2010

David J. Kappos
*Director of the United States Patent and Trademark Office*